United States Patent
Ballester

(10) Patent No.: US 7,040,449 B2
(45) Date of Patent: May 9, 2006

(54) POWER STEERING GEARBOX MECHANISM FOR A VEHICLE INCLUDING A HYDRAULIC FLUID FLOW CONTROL DEVICE DEPENDANT FROM A SPEED AT WHICH THE VEHICLE IS RUNNING

(75) Inventor: Adrian Ballester, Buenos Aires (AR)

(73) Assignee: Visteon Automotive Systems,Inc., Dearborn, MI (US)

( * ) Notice: Subject to any disclaimer, the term of this patent is extended or adjusted under 35 U.S.C. 154(b) by 0 days.

(21) Appl. No.: 10/175,326

(22) Filed: Jun. 20, 2002

(65) Prior Publication Data

US 2003/0024757 A1 Feb. 6, 2003

(30) Foreign Application Priority Data

Aug. 2, 2001 (AR) ............................... P010103700

(51) Int. Cl.
*B62D 5/06* (2006.01)
(52) U.S. Cl. ...................................... 180/423; 180/423
(58) Field of Classification Search ................ 180/417, 180/421, 422, 423, 404
See application file for complete search history.

(56) References Cited

U.S. PATENT DOCUMENTS

| 4,417,640 A | * | 11/1983 | Abe et al. .................... 180/422 |
| 6,122,912 A | * | 9/2000 | Phillips ........................ 60/413 |
| 2003/0127275 A1 | * | 7/2003 | Rogers et al. .............. 180/417 |

* cited by examiner

*Primary Examiner*—Kevin Hurley
(74) *Attorney, Agent, or Firm*—Egbert Law Offices

(57) ABSTRACT

Steering gearbox mechanism for automotive vehicles that allows feeding the hydraulic fluid control mechanism of said steering mechanism with pressurized hydraulic fluid, depending on the vehicle's working conditions. Thus, when the vehicle is stopped or running at a very low speed, the hydraulic fluid is sent to the steering mechanism for assistance. At this condition, the user may carry out the driving maneuvers effortlessly. Moreover, when the vehicle is running at high speeds, the assistance is disconnected, by means of deviating the pressurized fluid back to the fluid reservoir, allowing the engine to continue impelling the pump but without assisting the steering mechanism since at those speeds the user can carry out any maneuver without any effort.

4 Claims, 1 Drawing Sheet

POWER STEERING GEARBOX MECHANISM FOR A VEHICLE INCLUDING A HYDRAULIC FLUID FLOW CONTROL DEVICE DEPENDANT FROM A SPEED AT WHICH THE VEHICLE IS RUNNING

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention is referred to a hydraulically powered steering gearbox mechanism for vehicles, which is capable of controlling such assistance relying on the speed of the vehicle. More particularly, it is referred to a steering gearbox mechanism that includes control means of said power steering for activating and disabling the same based on the information coming from other measurement means of the vehicle, such as the on-board computer. Basically, the present invention is referred to a system for controlling the assistance of the powered steering mechanism depending on the speed at which the vehicle is running, and based on this information the assistance fluid flow towards gearbox hydraulic is controlled or re-addressed to the hydraulic flow reservoir.

BACKGROUND OF THE INVENTION

At present, there are in the market thousands of different types of powered steering gearboxes. Most of them, and those most broadly applied by the automotive industry, are powered steering gearboxes including an assistance pump that energizes the hydraulic circuit in charge of assisting the rack bar and pinion gearbox mechanism of the steering gearbox.

This kind of assistance has the inconvenience that the pump is permanently connected while the vehicle is running, either when it circulates at 10 m/h or 150 m/h. It is already known in the automotive industry that steering gearboxes require such assistance only when the vehicle requires maneuvering at low speed, while at high speed the power steering mechanisms are practically inactive. However, the assistance pump continues working, consuming unnecessary energy from the engine which, depending on the case, may range about 4–5 HP.

It is an object of the present invention for a fluid flow control device for controlling the assistance fluid circuit. The fluid may be directed to the hydraulic pump or to the fluid reservoir depending on the speed at which the vehicle is running. When the vehicle circulates under certain parameters, for example at high speed, the hydraulic assistance is not necessary, so the fluid is directed to the reservoir, and when the vehicle is stopped or running at a low speed the fluid is directed to the pump for assisting the steering mechanism. This allows the pump to work in vacuum when the vehicle circulates at high speed, (avoiding impelling a pump unnecessarily), reducing the engine wearing and fuel consumption.

There are several control mechanisms for controlling the steering assistance depending on the working conditions of the engine. For example, U.S. Pat. No. 5,740,880 of Miller et al, discloses electric motors having controllable induced armature fields, such as induction motors and synchronous reluctance motors, used in power assisted steering systems for motor vehicles. Tailoring induced armature fields conserves power or rotor flux in accordance with the speeds of motor vehicles including the power assisted steering system. In particular, one or more flux programs or maps are provided for the power assisted steering system with the flux map or program being accessed or addressed by means of the vehicle speed. During low speed operation of the motor vehicle, for example to perform parking maneuvers where speeds are near zero and steering forces are near or at maximum, the rotor flux is programmed to maximum. For high speed operation, such as highway and rural motor vehicle operation, the rotor flux is programmed to a low value so that internal loss mechanisms in the power assist motor and motor controller are minimized yet provide sufficient rotor flux to meet steering needs such as lane changes, obstacle avoidance and the like. Various transition speeds and flux transition curves provide smooth transitions between high flux levels and low flux levels.

This solution can be applied to an electric steering gearbox, but cannot be applied to a hydraulic gearbox, since it is not possible to control pump pressure, like the value of current in the present case.

U.S. Pat. No. 5,794,736 is referred to a fluid control system for a vehicle power steering mechanism having a manually driven steering member and a fluid driven driving member operatively connected to steering means of the vehicle by which steerage of the vehicle is achieved, the system including a first valve for metering pressurized fluid flow to the fluid operated driving member in response to the force required to move the steering means when operating the manually driven steering member, the first valve including at least two independent metering valve means each of which are simultaneously operated by the steering member to meter fluid flow to and/or from the fluid operated driving member at a predefined rate, at least one of the metering valve means communicating independently to a drain via a second valve being arranged to selectively connect and disconnect said at least one of said valve means to the drain in response to vehicle speed.

All these mechanisms tend to regulate the fluid pressure by acting on the fluid pump or regulating flow through valves, in order to maximize circuit power when the vehicle is stopped or running at a very low speed and minimize it at high speed.

None of the well-known means leaves the pump working in vacuum depending on the vehicle working conditions, as the present invention does.

BRIEF SUMMARY OF THE INVENTION

It is an object of the present invention for a steering gearbox mechanism for automotive vehicles that allows feeding said hydraulic fluid control mechanism of said steering mechanism with pressurized hydraulic fluid, depending on vehicle's working conditions. Thus, when the vehicle is stopped or running at a very low speed, the hydraulic fluid is sent to the steering mechanism for assistance. At this condition, the user may carry out the driving maneuvers effortlessly. Moreover, when the vehicle is running at high speed the assistance is disconnected, by means of deviating the pressurized fluid back to the fluid reservoir, allowing the engine to continue impelling the pump but without assisting the steering mechanism since at those speeds the user can carry out any maneuver without any effort.

Summing up, the present invention is referred to a power steering mechanism for vehicles including a hydraulic fluid flow control device dependant from the speed at which the vehicle is running, wherein said gearbox comprises a rack bar-and-pinion mechanism hydraulically assisted by a hydraulic power system which comprises a hydraulic control means, a hydraulic fluid reservoir, pipes forming a fluid communication network, and a fluid pump. Said hydraulic fluid flow control device is installed in the pipe network of a first pipe, a second pipe, a third pipe and a fourth pipe, for addressing the pressurized fluid to the fluid reservoir again when the vehicle is running at a predetermined speed range (for instance, higher than 60 km/h), and to the steering mechanism when the vehicle is running out of the above cited speed range (for instance, between 0–60 km/h); said hydraulic fluid flow control device is activated by an electrical signal coming from sensor means of the vehicle.

BRIEF DESCRIPTION OF THE SEVERAL VIEWS OF THE DRAWINGS

The above mentioned features are some of the most important improvements of the present invention, which will be described in detail in accordance with the accompanying drawing, as an illustrative example.

DETAILED DESCRIPTION OF THE INVENTION

Figure 1:
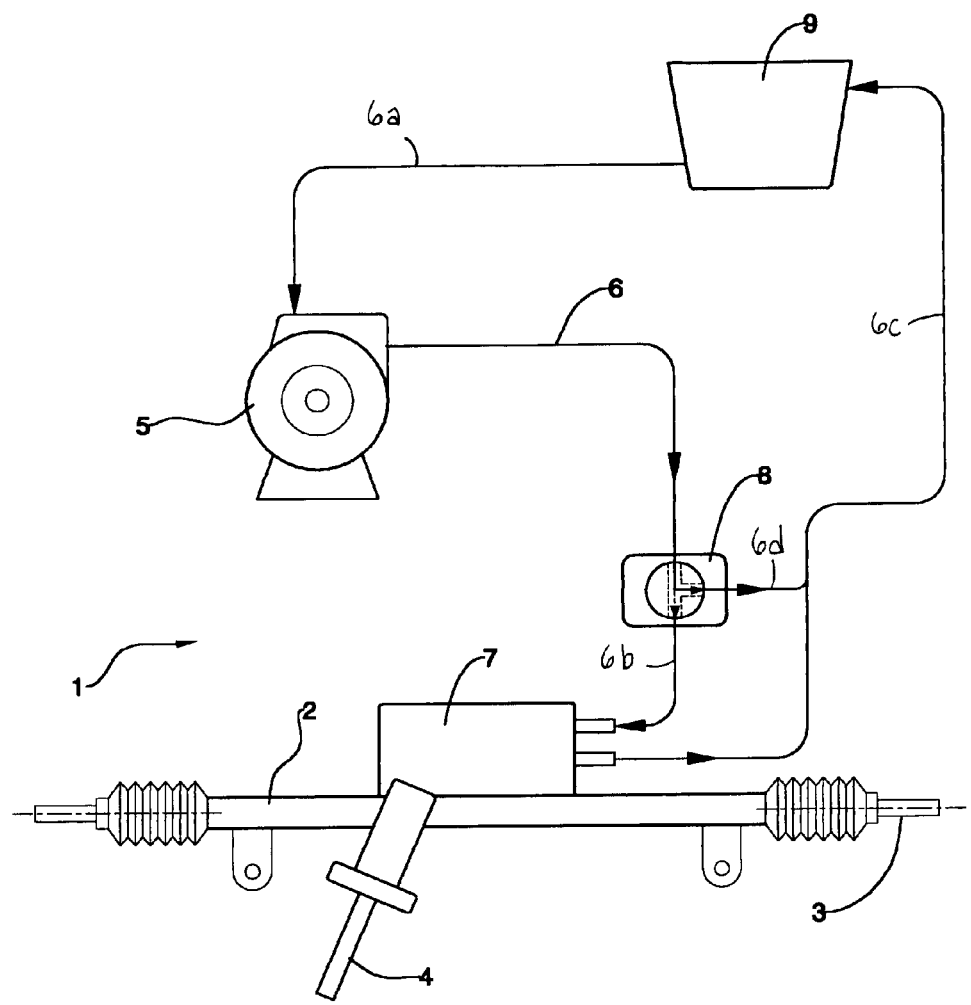
FIG. 1 is a side schematic view showing the hydraulic circuit including the hydraulic controls gearbox, the two-way electro magnetically-controlled valve, the pump and the reservoir of hydraulic fluid.

Making reference to the accompanying drawings, the present invention, indicated with the general reference 1, comprises a steering gearbox 2 comprising, as usual, a rack bar 3 connected through a pinion to the driving column 4 of the vehicle. Assistance means comprise a hydraulic pump 5 impelled by the vehicle's engine, connected to the gearbox 2 through a pipe 6 channeling the pressurized fluid to assist it. The gearbox 2 includes, as it is known in the art, a hydraulic control means 7 not described in detail since it does not form part of the present invention.

This pipe 6 includes a two-way valve 8 electrically commanded by an electric pulse received from some control means of the vehicle, for example, the vehicle's dashboard. In this case the control means can be the vehicle's on-board computer, which sends information through a connector. Said computer can be programmed so that, when the vehicle circulates at a certain speed, for example at 60 km/h, it sends a signal to the electromagnetic control of the two-way valve 8 for deviating the fluid that leaves the pump 5 toward the hydraulic control means 7 again to the reservoir, thus leaving the pump 5 operating in vacuum.

Thus, when the vehicle is running at certain working conditions, for example between 0–60 km/h, the pump works the whole time fully loaded, offering constant assistance to the gearbox mechanism, through the hydraulic control 7. When the vehicle is running at more than 60 km/h the computer will send an electrical signal, to the electro-mechanical control of the two-way valve 8 deviating the fluid to the reservoir 9 and therefore avoiding the vehicle's engine to impel the pump 5 that works in vacuum. Under these working conditions, the pump consumes approximately 0.5 HP, that is to say approximately 10% of the full load consumption of about 5–6 HP/hour.

This way, the vehicle saves fuel, since the pump usually consumes between 4–5 CV from the total deliverable power of the vehicle's engine. At the same time, a longer duration of the assistance pump is achieved which works only when is required by the vehicle working conditions.

The arrows indicated in the enclosed drawing exemplify the circulation sense of the hydraulic fluid. Thus the fluid coming from the reservoir 9 is channeled to the pump 5 by a first pipe 6a, which impels it through the pipe 6 up to the valve 8. This valve includes a control unit (not illustrated) for channeling hydraulic pressurized fluid to the gearbox 2 through one of its ways when the vehicle runs at less than 60 km/h. In that case, the hydraulic fluid enters the hydraulic control means 7 by a second pine 6b to assist the gearbox 2, as usual, and at the exit, it is readdressed to the reservoir 9 by a third pipe 6c.

On the other hand, when the vehicle circulates at more than 60 km/h, the valve 8 deviates the flow again to the reservoir 9 without passing by said control means 7 by a fourth pipe 6d, therefore the pump works in vacuum, reducing its consumption to 10% from the full load consumption.

By means of a conceptual and structurally simple realization is possible to improve the traditional steering mechanism, simultaneously achieving fuel saving and less waste of the means involved in said assistance that, by means of the application of the present invention, they are used more efficiently.

I claim:

1. A power steering gearbox mechanism for vehicles comprising:
   a steering column;
   a rack-and-pinion mechanism connected to said steering column;
   a hydraulic control means operatively connected to said rack-and-pinion mechanism for assisting a movement of said rack-and-pinion mechanism relative to a rotation of said steering column;
   a pump means connected to said hydraulic control means through a hydraulic fluid reservoir;
   a valve means connected to said pump means;
   a first pipe extending from said hydraulic fluid reservoir to said pump means;
   a second pipe extending from said valve means to said hydraulic control means;
   a third pipe extending from said hydraulic control means to said hydraulic fluid reservoir; and
   a fourth pipe extending from said valve means so as to connect directly to said hydraulic fluid reservoir or into said third pipe, said valve means being movable between a first position and a second position, said first position for directing a hydraulic fluid through said first and second pipes from said hydraulic fluid reservoir to said hydraulic control means, said second position for directing the hydraulic fluid from said hydraulic fluid reservoir through at least said fourth pipe back to said hydraulic fluid reservoir without passing through said second pipe and through said hydraulic control means, said pump means for pumping hydraulic fluid through the valve means;
   a sensor means cooperatively connected to said valve means, said sensor means for sensing a speed of the vehicle, said sensor means for sending an electrical signal to said valve means for moving said valve means to said first position when the speed of the vehicle is below a predetermined value, said sensor means for sending another electrical signal to said valve means when the speed of the vehicle is above a predetermined value.

2. The mechanism of claim 1, said valve means being a two-way valve.

3. The mechanism of claim 1, said sensor means comprising an on-board computer on the vehicle.

4. The mechanism of claim 1, said predetermined value of the speed of the vehicle being 60 km/hour.

* * * * *